(12) United States Patent
Fernández Ledesma et al.

(10) Patent No.: US 12,343,721 B2
(45) Date of Patent: Jul. 1, 2025

(54) MICROFLUIDIC CHIP, MICROFLUIDIC DEVICE, ASSOCIATED USES AND METHODS

(71) Applicants: UNIVERSIDAD DE ZARAGOZA, Saragossa (ES); INSTITUTO TECNOLÓGICO DE ARAGÓN, Saragossa (ES); CENTRO DE INVESTIGACIÓN BIOMÉDICA EN RED, Madrid (ES)

(72) Inventors: Luis José Fernández Ledesma, Saragossa (ES); Rosa Maria Monge Prieto, Saragossa (ES); Jose Luis Calavia Calvo, Saragossa (ES); Jorge Santolaria Mazo, Saragossa (ES); Javier Orús Pontaque, Saragossa (ES); Carlos Peribáñez Subirón, Saragossa (ES); José Manuel Rodriguez Fortún, Saragossa (ES); Ignacio Ochoa Garrido, Madrid (ES)

(73) Assignees: UNIVERSIDAD DE ZARAGOZA, Saragossa (ES); INSTITUTO TECNOLÓGICO DE ARAGÓN, Saragossa (ES); CENTRO DE INVESTIGACIÓN BIOMÉDICA EN RED, Madrid (ES)

( * ) Notice: Subject to any disclaimer, the term of this patent is extended or adjusted under 35 U.S.C. 154(b) by 1302 days.

(21) Appl. No.: 15/771,161

(22) PCT Filed: Oct. 14, 2016

(86) PCT No.: PCT/ES2016/070726
§ 371 (c)(1),
(2) Date: Apr. 26, 2018

(87) PCT Pub. No.: WO2017/072379
PCT Pub. Date: May 4, 2017

(65) Prior Publication Data
US 2018/0333721 A1    Nov. 22, 2018

(30) Foreign Application Priority Data
Oct. 27, 2015   (ES) .................. 201531539

(51) Int. Cl.
*B01L 3/00*         (2006.01)
*B01L 9/00*         (2006.01)
(Continued)

(52) U.S. Cl.
CPC .......... *B01L 3/502707* (2013.01); *B01L 3/00* (2013.01); *B01L 3/502715* (2013.01);
(Continued)

(58) Field of Classification Search
CPC ................. B01L 3/502707; B01L 3/00; B01L 3/502715; B01L 3/502738; B01L 9/50;
(Continued)

(56) References Cited

U.S. PATENT DOCUMENTS 8,062,612 B2    11/2011  Mcavoy et al.
2004/0195539 A1  10/2004  Mead et al.
(Continued)

FOREIGN PATENT DOCUMENTS

WO   WO 2004/079241 A1   9/2004
WO   WO 2004/081741 A2   9/2004
WO   WO-2008032128 A1 *  3/2008   ............. B81C 3/001

OTHER PUBLICATIONS

International Search Report and Written Opinion issued in PCT/ES2016/070726 mailed Feb. 15, 2017.

*Primary Examiner* — Jennifer Wecker
*Assistant Examiner* — Steven Ray Castaneda
(74) *Attorney, Agent, or Firm* — ArentFox Schiff LLP

(57) ABSTRACT

The present invention relates to a chip equipped with a plurality of compact microfluidic valves with multiple inlets
(Continued)

and outlets, actuated by means of a flexible membrane system. The chip preferably comprises a deformable sealing layer made of at least one flexible, elastic, and insulating material; a structure formed by a succession of one or several microstructured layers, wherein said structure comprises one or several micro-chambers, one or several microfluidic channels, and one or several fluidic inlets and outlets; and wherein said structure is installed on a base substrate. The invention likewise relates to a microfluidic device that comprises the aforementioned chip, to a method for the fabrication of the chip, and to the uses associated with the chip and the microfluidic device.

13 Claims, 6 Drawing Sheets

(51) Int. Cl.
*B32B 3/30* (2006.01)
*B32B 25/08* (2006.01)
*B32B 37/16* (2006.01)
*B32B 37/18* (2006.01)
*B32B 38/00* (2006.01)
*F16K 99/00* (2006.01)

(52) U.S. Cl.
CPC .......... *B01L 3/502738* (2013.01); *B01L 9/50* (2013.01); *B32B 3/30* (2013.01); *B32B 25/08* (2013.01); *B32B 37/16* (2013.01); *B32B 37/182* (2013.01); *B32B 38/0008* (2013.01); *F16K 99/0015* (2013.01); *F16K 99/0048* (2013.01); *B01L 2200/027* (2013.01); *B01L 2200/0689* (2013.01); *B01L 2200/12* (2013.01); *B01L 2300/043* (2013.01); *B01L 2300/123* (2013.01); *B01L 2400/0484* (2013.01); *B01L 2400/06* (2013.01); *B01L 2400/0638* (2013.01); *B01L 2400/0655* (2013.01); *F16K 2099/0084* (2013.01)

(58) Field of Classification Search
CPC ....... B01L 2200/027; B01L 2200/0689; B01L 2200/12; B01L 2300/123; B01L 2400/0484; B01L 2400/06; B01L 2400/0638; B32B 3/30; B32B 25/08; B32B 37/16; B32B 37/182; B32B 38/0008; F16K 99/0015; F16K 99/0048; F16K 2099/0084
See application file for complete search history.

(56) References Cited

U.S. PATENT DOCUMENTS

| | | | |
|---|---|---|---|
| 2007/0084706 A1* | 4/2007 | Takayama | B01L 3/502738 200/182 |
| 2008/0108095 A1* | 5/2008 | Li | G01N 33/5438 435/7.93 |
| 2008/0142157 A1 | 6/2008 | Maltezos et al. | |
| 2010/0327211 A1* | 12/2010 | Fernandez Ledesma | F16K 99/0015 251/368 |
| 2012/0214254 A1 | 8/2012 | Schmidt et al. | |
| 2014/0023564 A1 | 1/2014 | Rothacher et al. | |
| 2014/0272719 A1* | 9/2014 | Liu | G01N 33/54373 430/322 |

* cited by examiner

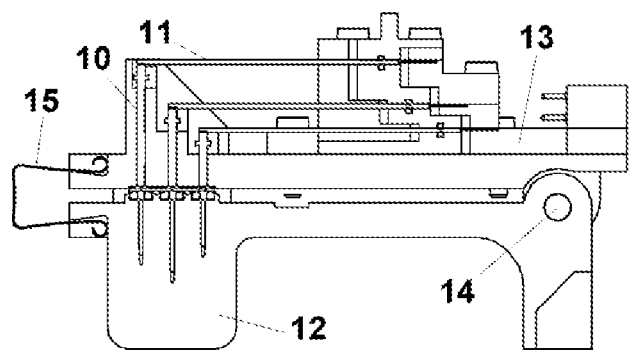
FIG. 8c
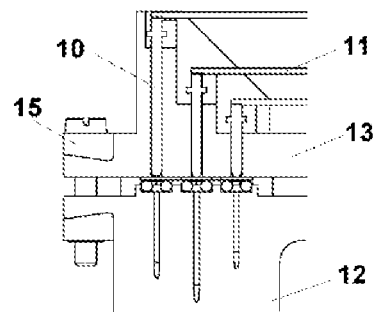   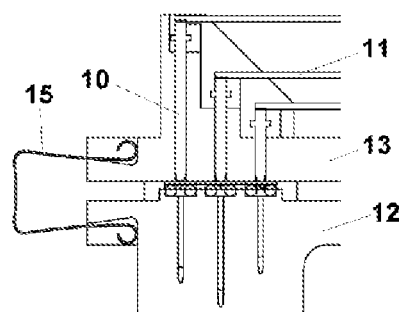
FIG. 9a              FIG. 9b
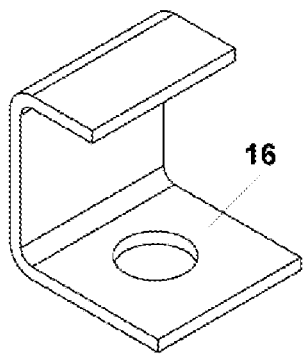   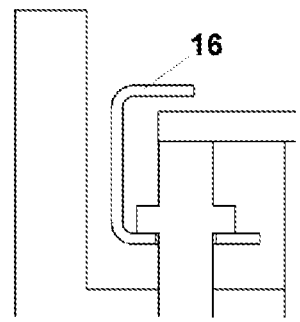
FIG. 10a             FIG. 10b

MICROFLUIDIC CHIP, MICROFLUIDIC DEVICE, ASSOCIATED USES AND METHODS

CROSS REFERENCE TO RELATED APPLICATION

This application is a U.S. National Phase Application of PCT/ES2016/070726 filed Oct. 14, 2016, which claims priority of Spanish Patent Application No.: P201531539 filed Oct. 27, 2015. The content of which is hereby incorporated by reference in its entirety.

FIELD OF THE INVENTION

The present invention falls within the technical field corresponding to microfluidic devices for the culturing of cell samples, with said devices known as "laboratories on a chip". More specifically, the invention relates to a chip equipped with a plurality of compact microfluidic valves with multiple inlets and outlets that can be actuated by means of a flexible membrane system. The invention likewise relates to a microfluidic device that comprises the aforementioned chip, a method for the fabrication of the chip, and the uses associated with the chip.

BACKGROUND OF THE INVENTION

The existence of a large number of "laboratory on a chip" systems for the culturing of cell samples is currently known. The different applications of these systems include the implementation of microfluidic membrane valves or pumps, based on chips on which an elastomer layer is deposited, covering one or more housings or chambers, whose volume is modified by means of the application of actuators on said elastomer layer. One example of the aforementioned systems is U.S. Pat. No. 8,062,612 B2 or U.S. patent application U.S. 2008/0142157 A1.

Although said systems allow the construction of valve systems on microfluidic chips, they all possess a severe limitation in regard to the minimum size that they can reach, because their fabrication methods are not effective for producing chips with culture housings with dimensions smaller than 1 mm, which also allow a large number of said housings to be made in the chips (thus favoring mass production of the chips).

On the other hand, with respect to the techniques of the implementation of actuator systems for known microfluidic chips, these also pose a limitation in regard to the minimum size of said actuators, which in practice means that, as a result of the minimum separation that must be maintained between consecutive actuators, devices are produced with an excessive volume of conduits and chambers, which requires the disposable element of the chip to be larger, which increases the economic cost of said disposable element, also requiring the use of larger quantities of fluid, and increasing the probability of the appearance of air bubbles, which are incompatible with the testing of live cells.

In addition, the known systems have little or no flexibility in the configuration of the internal distribution of the conduits and micro-chambers in the chip, due to the need to use molds for the fabrication of the disposable part, making it very costly to modify the design, as well as the number, of the internal connections between micro-chambers, inlets and outlets in the chip.

The present invention proposes a solution to the technical problems mentioned above, by means of a novel microfluidic chip whose technical elements and fabrication process allow it to overcome the limitations of the systems in the state of the art.

BRIEF DESCRIPTION OF THE INVENTION

One object of the present invention is therefore the production of microfluidic chips that possess a high degree of miniaturization, and that also allow the effective execution of microfluidic valves and pumps.

Said object of invention is achieved, preferably, by means of a method for fabrication of the microfluidic chip of the type that comprises:
  a deformable sealing layer, with said layer made of a flexible, elastic, and insulating material;
  a structure formed by a succession of one or several micro-structured layers, which comprise: one or several micro-chambers, one or several microfluidic channels for the circulation of fluid to or from the micro-chambers, and one or several fluidic inlets and outlets; and
  a base substrate.

Advantageously, the method of the invention comprises the following steps:
  application of a plasma cleaning treatment to the micro-structured layer or layers and to the deformable sealing layer;
  application of material that comprises a compound that includes amine (—NH2) and hydroxyl (—OH) free radicals to the micro-structured layer or layers and to the deformable sealing layer. Said compound is, for example, APTES (3-Aminopropyl triethoxysilane);
  arrangement of the deformable sealing layer on the structure of the micro-structured layer or layers;
  application of pressure and temperature to the structure of the micro-structured layer or layers and to the deformable sealing layer, for the purpose of sealing said layers.

Preferably, the temperature is applied in a range between 70 and 100° C. and the pressure is applied in a range between 0.1 and 5 bar, during a sealing time of between 5 and 45 minutes. Likewise, the cleaning plasma is, preferably, oxygen and/or nitrogen plasma.

The base substrate of the chip of the invention is made, preferably, on a solid component fabricated by means of machining, deposition, or stratification. More preferably, said material comprises a photosensitive resin SU-8, Poly (methyl methacrylate) (PMMA), cyclic olefin copolymers (COC), cyclic olefin polymers (COP), polycarbonate (PC) and/or a similar thermoplastic material. The flexible, elastic, and insulating material of the coating layer comprises an elastomeric material, such as silicone or polydimethylsiloxane (PDMS).

By means of the method of the invention, it is possible to achieve a high degree of miniaturization in the chips fabricated, whose chambers and conduits may have dimensions smaller than tenths of a micrometer.

Another object of the invention relates to, likewise, a microfluidic chip of the type that comprises:
  a deformable sealing layer, with said layer made of a flexible, elastic, and insulating material;
  a structure formed by a succession of one or several micro-structured layers, which comprise: one or several micro-chambers, one or several microfluidic channels for the circulation of fluid to or from the micro-chambers, and one or several fluidic inlets and outlets; and
  a base substrate;

wherein said chip is manufactured by means of a fabrication method according to any of the embodiments described in the present document.

A third object of the invention relates to a microfluidic device that comprises the microfluidic chip described above and that additionally comprises:

a plurality of closing pins arranged for the application thereof to the deformable sealing layer of the chip, providing the closure of the micro-chambers, acting as valves, by means of the deformation of the coating layer in response to the pressure exerted by said pins; and a plurality of actuators, configured to apply the closing pins to the deformable sealing layer.

Preferably, the actuators are cantilevered piezoelectric actuators (in other words, in an overhanging arrangement for their application on the pins). More preferably, the device of the invention comprises connection elements between the piezoelectric actuators and the closing pins, configured to give said closing pins actuation capabilities in both directions, to both push the pin as well as to pull on it to open the valve.

Preferably, the description of the invention comprises a plurality of conduits that have sealed connections to the plurality of inlets and outlets of the chip. More preferably, said connections are made by means of toric seals.

Additionally, in a preferred embodiment of the invention, the microfluidic device comprises a support structure with, at least:

a first housing sub-structure of the chip;

a second housing sub-structure of the closing pins and the actuators;

a connection between the first and second sub-structures, preferably by means of guide pins, a hinge, or a similar element;

a closure between the first and second sub-structures, preferably a clip closure, elastic connection, holder clip, clamp, screw or similar element, which comprises:

a closed position configured to keep the first and second sub-structures in contact, wherein the closing pins are arranged facing each other against the deformable sealing layer of the chip; and an open position configured to keep the first and second sub-structures separated, allowing access to the microfluidic chip.

Preferably, the device comprises a rechargeable battery and/or a charger from the electrical network for the power supply of the piezoelectric actuators. Likewise, the device may also have a wireless control means or programmable integrated electronic control of the piezoelectric actuators.

In a preferred embodiment of the invention, the housing sub-structures are fabricated with machined aluminum in the areas that are not in contact with electrical elements. Alternatively, said structures may be made of plastic materials, for example injected thermoplastic.

In another preferred embodiment of the invention, the first housing sub-structure of the chip, or part of the same, comprises a disposable encapsulation. This gives the device of the invention a high degree of ease of use, with the possibility of replacing the used chips if their channels become blocked, or when a new experiment is to be carried out, without the need to access the chip itself. This way, the encapsulation just needs to be removed and replaced with a new one, which is secured to the rest of the first housing sub-structure of the chip or the second housing sub-structure of the pins and the actuators by means of the closure (clip, elastic connection, screw, holder clip, clamp, or similar element).

In other alternative embodiments of the invention, the microfluidic device described may also be applied to other systems of microfluidic chips.

A fourth object of the invention relates to the use of a chip or a microfluidic device according to any of the embodiments described in the present document, for the implementation of microfluidic valve systems or for the implementation of microfluidic pump systems.

In addition to its high degree of miniaturization, some additional advantages provided by the proposed invention are, principally:

Effective, simple, and accessible inspection and location of the disposable chip. The rest of the components of the device may be reusable or disposable, allowing cleaning and disinfection processes.

Independently opening and closing the different connections established between inlets and outlets without leaks, with a flexible and configurable number of inlets and outlets depending on requirements. The complete design of the chip and of the device of the invention is scalable, such that, with simple variations, it is able to contain a larger or smaller number of valves, depending on the specific needs.

Modular and adjustable installation by means of simple, economical, and accessible components that can be replaced in case of a malfunction, thanks to the independence of systems and functions, such that complete functional assemblies can be replaced simply.

Low energy consumption, which allows portable use of the device.

Simplification of the electrical connections, thanks to the internal connection of common poles of actuators by means of contacts inserted into the assembly module, such that the number of wires required for power supply and control is minimized.

Protection against fluid leaks, using the position and orientation of the closing pins to prevent accidental contact between the fluid and sensitive and electrical parts of the device.

DESCRIPTION OF THE FIGURES

FIGS. 8a-8c show three views of a preferred embodiment of the device of the invention, which show its housing sub-structures of the microfluidic chip and of the closing pins and of the actuators, and a hinged connection of said sub-structures.

FIGS. 9a-9b show two examples of means of closing the first and second sub-structures of the microfluidic device, according to a preferred embodiment of the invention, based on a screw mechanism (FIG. 9a) and a closure by means of an elastic clip element (FIG. 9b).

FIGS. 10a-10b show two views of connection elements between the actuators and the heads of the closing pins of the invention, showing said elements, respectively, isolated (FIG. 10a) and integrated into a connection (FIG. 10b).

DETAILED DESCRIPTION OF THE INVENTION

Figure 1A:
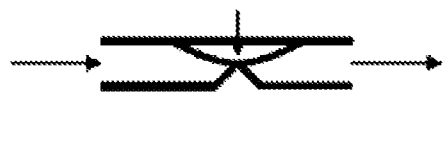
FIGS. 1a and 1b show typical embodiment diagrams of membrane valves used in microfluidics.

As described in preceding paragraphs, one object of the present invention relates to a microfluidic chip especially intended for the study and culturing of cell samples, to which end it comprises means for housing said samples, as well as a plurality of microfluidic channels for the circulation of fluids (for example, for the feeding of the housed samples). In this sense, the microfluidic chip of the invention comprises a principal structure formed by a succession of one or several micro-structured layers (3) arranged on a base substrate (7). The structure of the micro-structured layer or layers (3) makes up a network of micro-chambers (2) and microfluidic channels (4), as well as fluidic inlets (5) and outlets (6), through which both the live cells to be studied and the fluids that will circulate through the microfluidic circuit can be introduced. The base substrate (7) may be manufactured by means of machining, deposition, or stratification.

The plurality of microstructured layers that make up the structure of the chip may be made of different materials, although preferably, it will be fabricated by means of deposition of SU-8, PMMA, COC, COP, PC and/or a similar thermoplastic material.

By means of an additional process, the structure of the chip may be covered by a deformable sealing layer (1) of flexible, elastic, and insulating material, such as elastomeric materials, silicone, or PDMS, being, for example, thin (tenths of a micrometer) transparent silicone, for the purpose of creating micro-chambers (2) on hollow zones on the surface of the chip, and to allow these zones to be observed through a microscope.

To secure the deformable sealing layer to the structure of micro-structured layers (3) that comprise SU-8, PMMA, COC, COP, PC and/or a similar thermoplastic material, the following steps are preferably carried out as part of the fabrication method for said chip:

Each one of the elements is initially subjected to a cleaning treatment with oxygen and/or nitrogen plasma.

Later, each one of the elements is subjected to fixing of APTES (3-Aminopropyl triethoxysilane) material. For example, said fixing can be done by means of a bath in a solution of 15% APTES for 1-30 minutes.

Lastly, both elements, the structure of micro-structured layers (3) and the deformable sealing layer (1), are sealed by means of regulation of temperature (preferably, in a range between 70° C. and 100° C.) and/or pressure (preferably, in a range between 0.1 and 5 bar), with a sealing time of between 5 and 45 minutes.

Figure 1B:
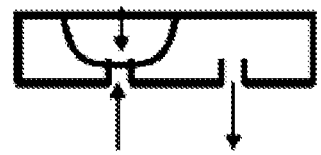

With respect to the functional design of the chip, the arrangement of housings and channels (4) of the structure of micro-structured layers (3) and of the deformable sealing layer (1) is such that when said layer is pressed from the exterior, it limits the space of the housings, and blocks one or more microfluidic channels, acting as a valve for the flow of fluid. FIGS. 1a and 1b show typical embodiment diagrams of these types of valve, known as membrane valves. In them, force is applied to a disk made of an elastic material, for example silicone or PDMS, deforming it to prevent the flow of fluid through a chamber or conduit made directly in the principal structure of the chip.

Figure 2A:
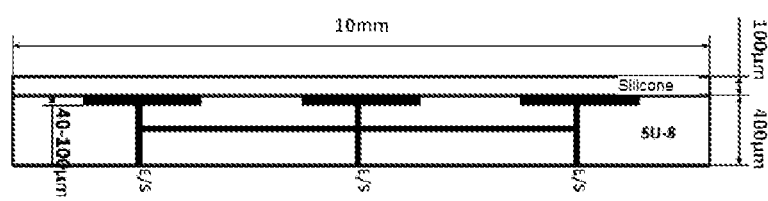
FIGS. 2a and 2b show a profile view and a top view, respectively, of the microfluidic chip of the invention, according to a preferred embodiment of the same based on nine housings and membrane valves, including an example of the typical dimensions of the chip, and wherein "E/S" indicates the fluid inlet/outlet channels.
Figure 2B:
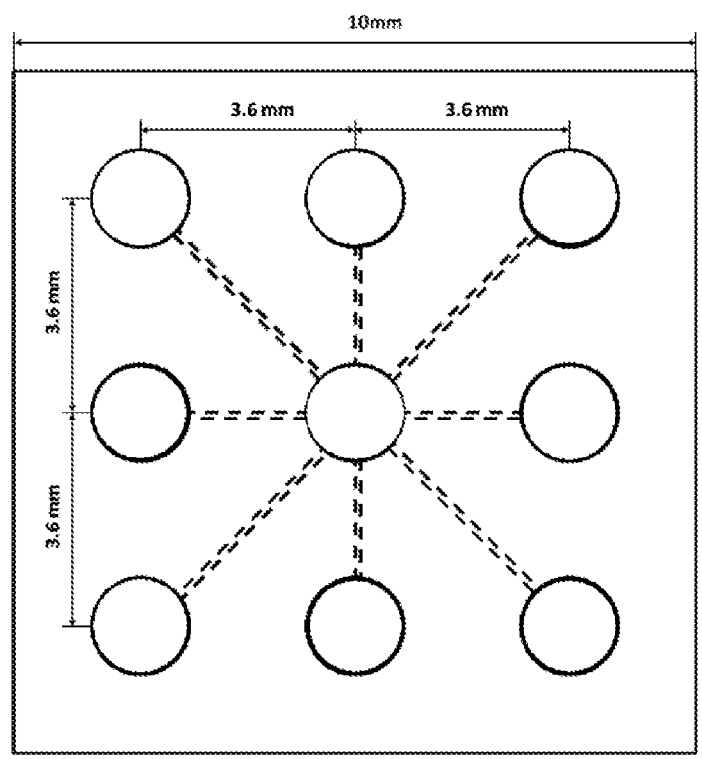

Preferably, the chip of the invention comprises a plurality of housings with their corresponding valves, which can be actuated by means of the deformation of the deformable sealing layer (1) (for example, the layer of silicone). FIGS. 2a and 2b show a profile view and a top view of a preferred embodiment of the invention based on nine housings and valves. As shown in said embodiment, the geometry of the chip serves as the starting point for the design, because it conditions the distribution and location of the rest of the elements. FIGS. 2a and 2b therefore show an initial chip design for use as a passive element to open and close the flow of fluid for the nine corresponding culture micro-chambers, and an example of its typical dimensions is included therein. As shown in the figures, thanks to the design of the chip of the invention and its novel fabrication method, it is possible to obtain very small dimensions for culture volumes, with overall chip areas, in the example described, on the scale of approximately 1 $cm^2$, wherein the diameters of the chambers are defined between 1 and 2 mm. Nevertheless, by means of the method of the invention, it is possible to obtain micro-chambers with slightly smaller dimensions, to the order of tenths of a micrometer. These dimensions cannot be achieved by means of other known fabrication techniques of membrane valves for microfluidics, which makes the present invention, as mentioned earlier, advantageous for mass-producing culturing devices, due to their high degree of miniaturization.

Figure 3A:
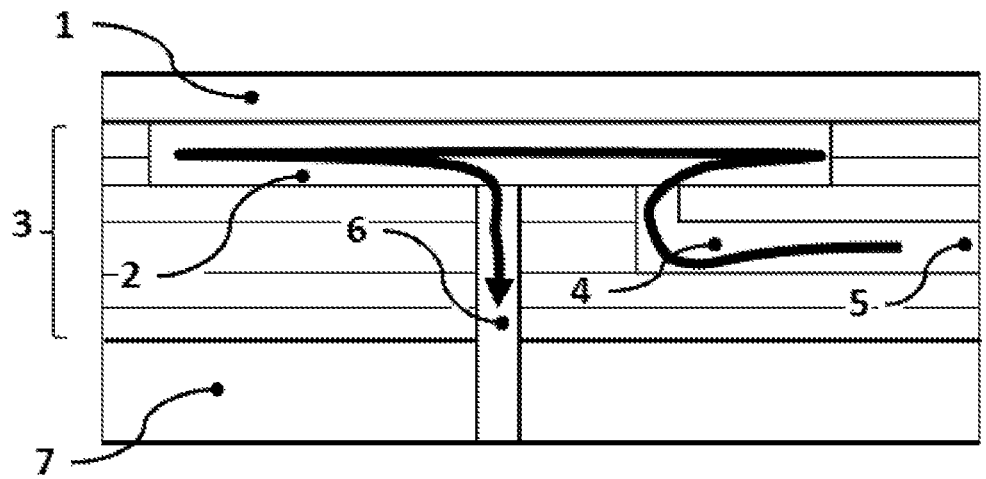
FIGS. 3a and 3b show a diagram of the opening and closing, respectively, of the valves of the chip of the invention in one of its preferred embodiments, wherein said closing is carried out by means of the pressure exerted on the deformable sealing layer.
Figure 3B:
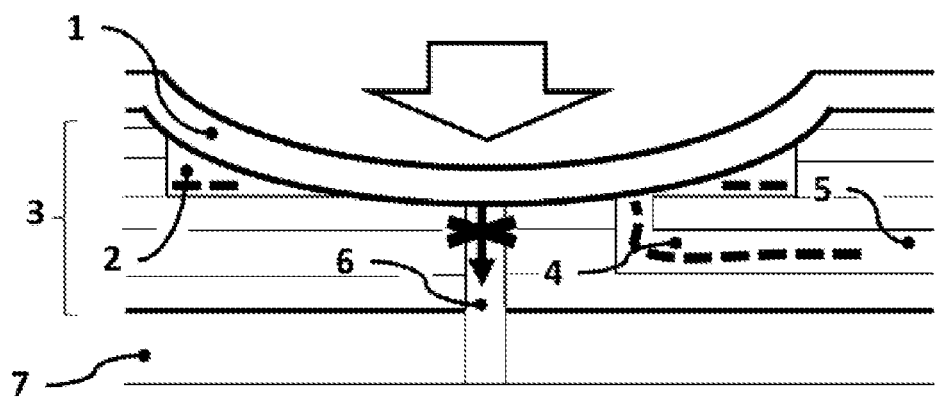

As shown schematically in FIGS. 3a and 3b, the valve mechanism to which the present invention relates is based on the mechanical deformation of the deformable sealing layer (1) (for example, made of silicone or PDMS) that covers the micro-chambers (2) described earlier. Said micro-chambers (2) are in turn configured in a succession of one or several micro-structured layers (3), which comprise one or several microfluidic channels (4) for the circulation of fluid to or from the micro-chambers (2), and one or several fluidic inlets (5) and outlets (6). Preferably, the structure of micro-structured layers (3) is deposited on a base substrate (7).

Figures 4A, 4B:
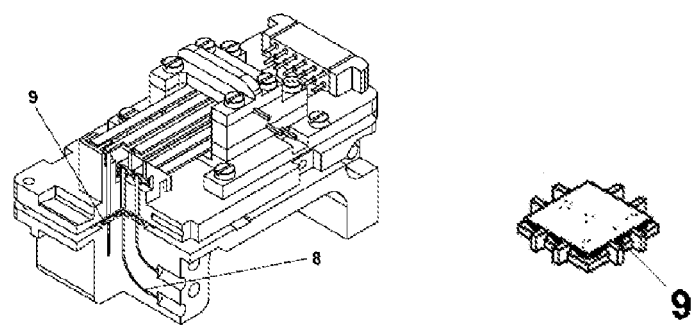
FIGS. 4a and 4b show perspective views of an embodiment of the microfluidic device of the invention, wherein its microfluidic conduits (FIG. 4a) and its con connections by means of toric seals (FIG. 4b) are shown.
Figure 5:
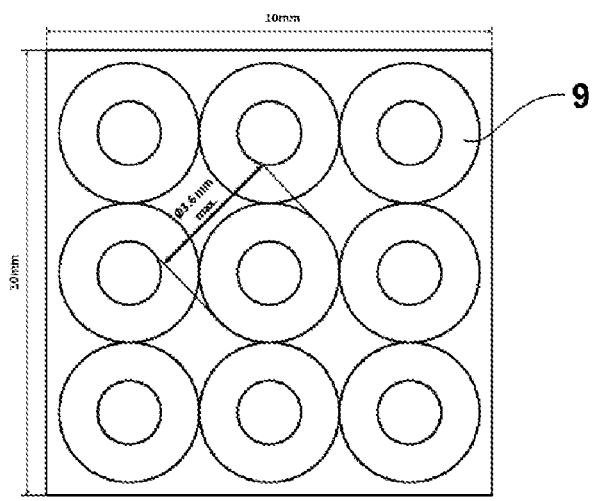
FIG. 5 shows a top schematic view of the chip of the invention, in one of its preferred embodiments, which shows the space available for each actuator, its corresponding closing pin, and its guide, and its associated dimensions, according to a preferred embodiment of the invention.

The inlets and outlets of the chip will be connected with the conduits (8), through which fluid will enter or exit (illustrated in FIG. 4a, connected below the chip). The watertightness of this connection is preferably provided by means of the use of toric seals (9) (illustrated in FIGS. 4a and 4b). The minimum dimensions of the toric seals condition the total size of the ship (see FIG. 5, which shows a top view of an exemplary arrangement of nine toric seals (9).

Another aspect of the invention relates to a microfluidic device that comprises a chip according to any of the embodiments described herein, and a means of actuating its valves, preferably independently for each one. Said actuation means preferably comprises a closing pin and an actuator for each valve to be operated. Given the small size of the chip of the invention in comparison with the valve chips of the state of the art, the space between each one of the valves conditions the type of actuation that can be applied, because it makes the installation of direct actuators (in other words, actuators located directly on the micro-chambers and the deformable sealing layer) practically impossible. Another conditioning factor for the installation of the actuators is the force required to close the device, which depends directly on the pressure of the fluid on the membrane and the surface area of the membrane (typically between 5 and 40 mbar).

Therefore, for the implementation of the microfluidic device of the invention equipped with microfluidic chips with multiple inlets and outlets, and which is based on the miniaturization capacity of the technology for the fabrication of chips for the use thereof as a passive and disposable element, preferably actuators (in combination with actuation points, known as "closing pins") based on smart materials, and more specifically, piezoelectric actuators, will be used.

Figure 6:
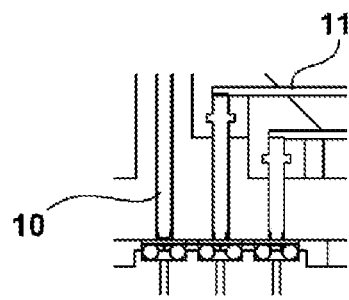
FIG. 6 shows a profile view of the arrangement of closing pins on the chip of the invention, in a preferred embodiment of the invention.
Figure 7A:
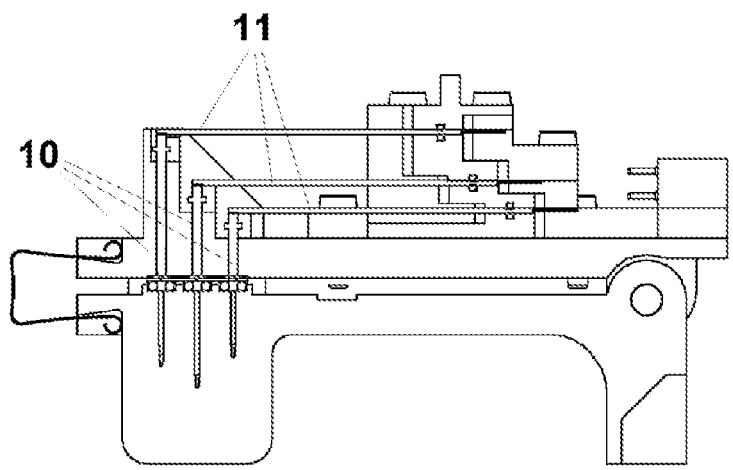
FIGS. 7a-7c show different perspective views of the arrangement of the closing pins and the cantilevered actuators, in a microfluidic device according to the preferred embodiment of the invention.
Figure 7B:
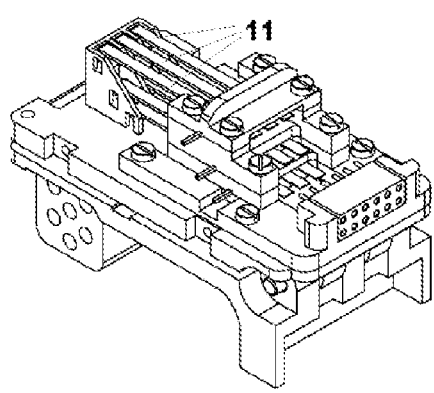
Figure 7C:
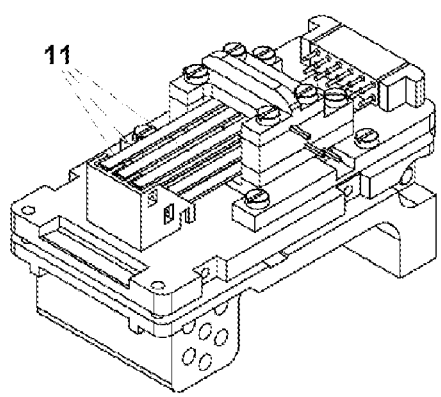

The design of the proposed device therefore makes use of a microfluidic chip according to the present invention, including a deformable sealing layer (for example, made of silicone) acting as a membrane and micro-chambers separated and isolated from the exterior that can be deformed by means of points or "closing pins" (10) (for example, metal pins), making it possible to alternate between the open and closed positions (FIG. 6, which shows the arrangement of closing pins (10) on the chip). Each one of these pins (10) is moved completely independently, by means of piezoelectric actuators (11), preferably with a cantilevered point-actuator arrangement (see, for example, FIGS. 7a-7c, which show a preferred embodiment with said actuators (11)). Thus a very small device is produced, which will consist of as many and chamber-pin-actuator modules as are desired. Likewise, in a possible embodiment of the invention, wireless control means or programmable integrated electronic control of the piezoelectric actuators (11) may be included. Likewise, the system can be equipped with a rechargeable battery and/or a charger from the electrical network for the power supply of the piezoelectric actuators.

Figure 8A:
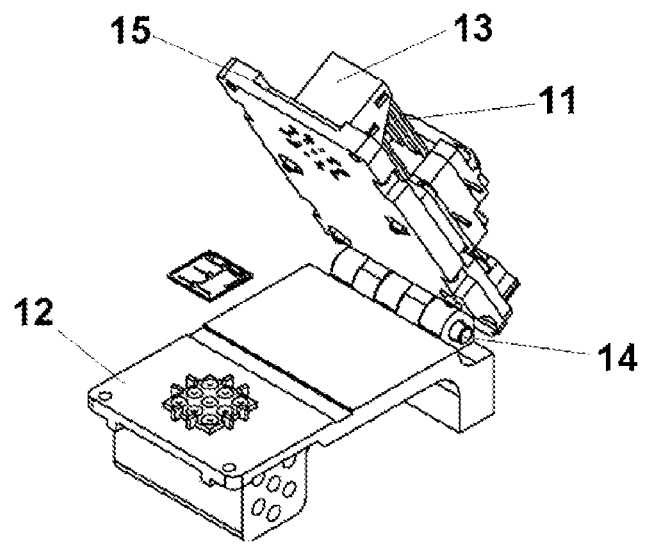
Figure 8B:
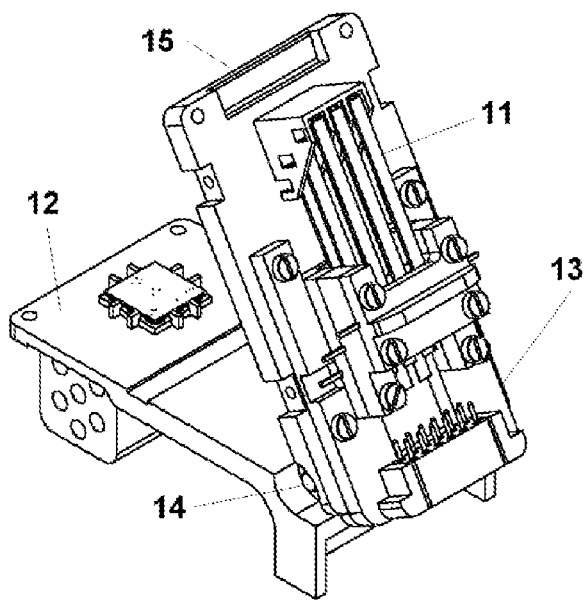

Preferably, as shown in FIGS. 8a-8c of the present document, the microfluidic device of the invention comprises a support structure with, at least:
- a first housing sub-structure (12) of the microfluidic chip (which corresponds to the lower part of the device, where the chip is positioned horizontally);
- a second housing sub-structure (13 for the closing pins (10) and piezoelectric actuators (11) (which corresponds to the top part of the device, where both the pins (10 and corresponding actuators (11) are installed);
- a connection (14) of the first sub-structure (12) and the second sub-structure (13), preferably hinged or with guide pins;
- a closure (15) of the first sub-structure (12) and the second sub-structure (13), preferably a clip, elastic connection, or screw, which comprises a closed position configured to keep the first sub-structure (12) and second sub-structure (13) in contact with each other, with the microfluidic chip positioned next to the closing pins (10) for their application to the deformable sealing layer (1) (which acts as a deformable membrane of the valves); and an open position configured to keep the first sub-structure (12) and the second sub-structure (13) separated, allowing access to the microfluidic chip. FIGS. 8a-8c show a hinged connection (14), with FIGS. 8a-8b corresponding, respectively, to perspective and profile views of a device in the open position, and FIG. 8c corresponding to a profile view of the device in the closed position.

In different possible embodiments of the invention, the housing sub-structures may be made of plastic materials, for example, injected thermoplastic, such as polyamide (PA) or acrylonitrile butadiene styrene (ABS), or with injected or machined aluminum in the regions that are not in contact with electrical elements.

To ensure watertightness during the use of the device, the closures (15) of the first sub-structure (12) and second sub-structure (13) may be provided, for example, by the use of a closure screw (FIG. 9a) or a closure by means of an elastic element, clip, holder clip, or clamp (FIG. 9b). These closures (15) also make it possible to reduce the influence of the assembly and fabrication tolerances of the other components on the movement function of the pins (10) and actuators (11). This avoids any type of rigid connection between the two, guaranteeing that unwanted forces are not transmitted due to position deviations in the assembly of the actuators (11). Likewise, the slightly angular movement of the actuators (11) is transformed into rectilinear movement without lateral reactions, avoiding accidental blockage as a result of the forces of friction, allowing gravity and other internal forces of the valve to be used to help in the movement of the pins (10).

Since the device has non-forced opening, if the necessary pressure in the device is too low, opening may not occur, because the device is unable to overcome the remaining resistance when the actuators (11) are withdrawn. To avoid this, an alternative design or complement is considered, which consists of several connection elements (16) between the actuators (11) and the heads of the pins (10) (FIGS. 10a and 10b) such that, without transmitting lateral forces, the actuators can pull the pins when they move in the upward direction, thus giving the device the capacity of actuation in the opening and/or closing direction.

Lastly, in addition to the use of the invention for cell culturing in microfluidic circuits, the alternative use of the chip and the microfluidic device described as a microfluidic pump is also considered, by means of designing a specific chip and the programming of the actuators in the device control, which allows it to function in a similar manner to a peristaltic pump. Another possible use of the invention comprises the combination of applications as pump and valve set, using different chambers on the same chip for different functions as a valve or peristaltic pump.

The invention claimed is:

1. A method for the fabrication of a microfluidic chip of the type that comprises:
   a deformable sealing layer, wherein said layer comprises a flexible, elastic, and insulating material;
   a structure formed by an arrangement of micro-structured layers comprising a thermoplastic material, wherein said structure comprises:
   one or several micro-chambers;
   one or several microfluidic channels for the circulation of fluid to and from the micro-chambers, and;
   one or several fluidic inlets and outlets;
   and a base substrate on which the structure of the micro-structured thermoplastic layers is arranged;
   said method characterized in that it comprises the following steps:
   a) applying a plasma cleaning treatment to the structure of micro-structured thermoplastic layers and to the deformable sealing layer;

b) after step a), applying (3-Aminopropyl triethoxysilane) (APTES) to the structure of micro-structured thermoplastic layers and to the deformable sealing layer, wherein APTES comprises amine (—NH2) and hydroxyl (—OH) free radicals;

c) after step b), arranging the deformable sealing layer on the structure of micro-structured thermoplastic layers;

d) after step c), applying a sealing temperature between 70 and 100° C. and a sealing pressure between 0.1 and 5 bar to the micro-structured thermoplastic layers and the deformable sealing layer for a sealing time between 5 and 45 minutes to seal said micro-structured thermoplastic layers to the deformable layer.

2. The method according to claim 1, wherein the cleaning plasma is oxygen and/or nitrogen plasma.

3. The method according to claim 1, wherein the base substrate is made by means of machining, deposition, or stratification.

4. The method according to claim 1, wherein the one or more of the micro-structured thermoplastic layers comprises SU-8, PMMA, COC, COP, and/or PC.

5. The method according to claim 1, wherein the base substrate comprises SU-8, PMMA, COC, COP, PC and/or thermoplastic material.

6. The method according to claim 1, wherein the deformable sealing layer comprises elastomeric material, silicone, or PDMS.

7. The method of claim 1, wherein a diameter of the one or several micro-chambers between 1 and 2 mm.

8. A microfluidic chip of the type that comprises:
a deformable sealing layer, with said layer comprising a flexible, elastic, and insulating material;
a structure formed of a plurality of micro-structured layers comprising a thermoplastic material, which comprises: one or several micro-chambers, one or several micro-fluidic channels for the circulation of fluid to or from the micro-chambers, and one or several fluidic inlets and outlets; and
and a base substrate on which the structure of the micro-structured thermoplastic layers is arranged; said chip characterized in that it is fabricated by means of a method according to claim 1.

9. A microfluidic device that comprises a chip according to claim 8, and that additionally comprises:
one or several closing pins arranged for the application thereof to the deformable sealing layer of the chip;
one or several actuators configured to apply the closing pins to the deformable sealing layer of the chip;
a first housing sub-structure for the chip;
a second housing sub-structure for the closing pins and the actuators;
a connection of the first sub-structure and the second sub-structure;
a closure of the first sub-structure and the second sub-structure.

10. The microfluidic device according to claim 9, wherein the actuators are cantilevered piezoelectric actuators.

11. The device according to claim 9, which comprises connection elements between the actuators and the closing pins, configured to give said closing pins actuation capabilities in both directions.

12. The device according to claim 9, wherein the connection is a hinge or guide pin type, and/or wherein the closure is a clip, elastic connection, holder clip, bracket, or screw type.

13. The device according to claim 9, wherein the first housing sub-structure for the chip, or part of the same, comprises a disposable encapsulation.

* * * * *